Nov. 20, 1951 N. I. SCHWALBE 2,575,565
ARRANGEMENT ON ROOF OF VEHICLES, VESSELS AND
BUILDINGS IN ORDER TO FACILITATE THE
LOADING AND UNLOADING OF GOODS
Filed Oct. 18, 1947 6 Sheets-Sheet 1

Inventor:
Nils Ingemar Schwalbe

Nov. 20, 1951  N. I. SCHWALBE  2,575,565
ARRANGEMENT ON ROOF OF VEHICLES, VESSELS AND
BUILDINGS IN ORDER TO FACILITATE THE
LOADING AND UNLOADING OF GOODS
Filed Oct. 18, 1947  6 Sheets-Sheet 2

Nov. 20, 1951 N. I. SCHWALBE 2,575,565
ARRANGEMENT ON ROOF OF VEHICLES, VESSELS AND
BUILDINGS IN ORDER TO FACILITATE THE
LOADING AND UNLOADING OF GOODS
Filed Oct. 18, 1947 6 Sheets-Sheet 4

Inventor:
Nils Ingemar Schwalbe

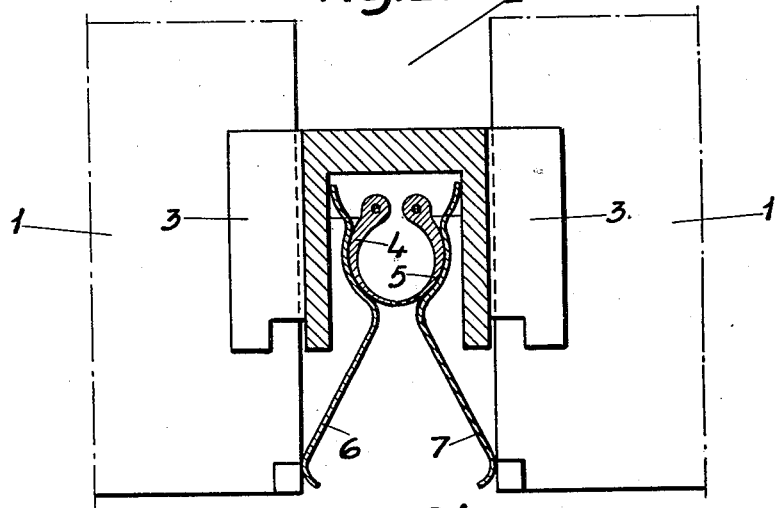
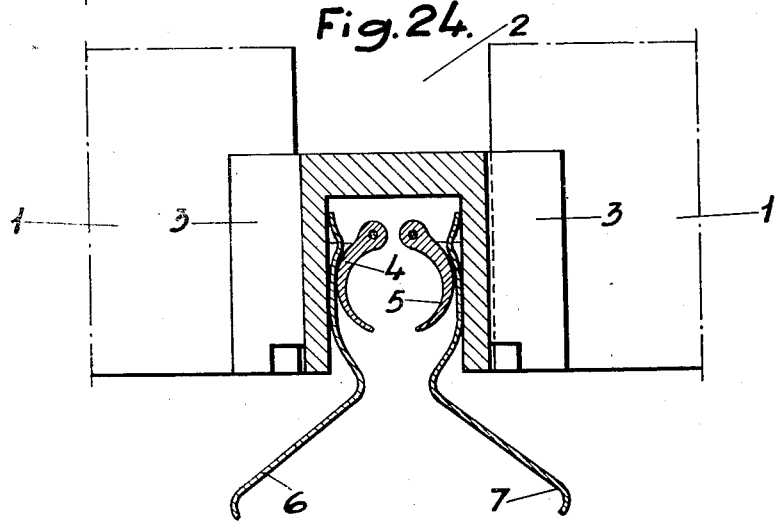

Nov. 20, 1951          N. I. SCHWALBE          2,575,565
ARRANGEMENT ON ROOF OF VEHICLES, VESSELS AND
BUILDINGS IN ORDER TO FACILITATE THE
LOADING AND UNLOADING OF GOODS

Filed Oct. 18, 1947          6 Sheets-Sheet 6

Inventor:
Nils Ingemar Schwalbe

Patented Nov. 20, 1951

2,575,565

UNITED STATES PATENT OFFICE 2,575,565

ARRANGEMENT ON ROOFS OF VEHICLES, VESSELS, AND BUILDINGS IN ORDER TO FACILITATE THE LOADING AND UNLOADING OF GOODS

Nils Ingemar Schwalbe, Akeslund, Stockholm, Sweden

Application October 18, 1947, Serial No. 780,646
In Sweden October 31, 1946

7 Claims. (Cl. 108—1)

The present invention refers to an arrangement on roofs, decks and other covering surfaces, underneath which goods of different kinds are kept, thus facilitating the loading and unloading of this goods. The arrangement consists mainly therein, that the roof has been provided with a slit, extending from an opening in the roof or the walls to the room underneath the roof and forward over the same room. By means of this slit it is made possible to take in a load hanging in a crane-hook or the like through the opening and further on into the room in such a way that the crane wire rope runs through the slit, while the crane makes its movements above the roof and the load is hanging in the wire rope under the roof. The characteristics of the arrangement in other respects is shown mainly by the following figures and attached explanations.

Of these figures Nos. 1–8 are showing the use of the invention to roofs of cars, Nos. 9–12 to roofs and decks of vessels, Nos. 13–15 to roofs of buildings, Nos. 16–27 are showing special details.

Fig. 1 gives a side view of a railroad car on which the invention is used. Fig. 2 shows the same car viewed from above. 1 and 2 are slits in the roof from which the covers or lids are lifted away. The load 3 hanging in the wire rope 4 is on its way into or out from the car. In order to facilitate introducing the wire rope 4 in the slit the mouth of the latter is enlarged like a funnel. This has been done by rounding off the corners 5 at the mouth of the slit.

Fig. 3 shows a car viewed from above with another arrangement of four slits 1, 2, 3 and 4. In order to get the middle part 10 of the car roof sufficiently joined with the car itself, the tapering parts 5 and 6 should have necessary width so as to prevent the points 7 and 8 being too easily bent up or down. This can also be prevented by placing supports 11 between floor and ceiling of the car at 7 and 8. If the door openings are now placed in the middle of the long sides of the car these supports will stand right in the middle of the openings. These openings must therefore have sufficient width on each side. See Fig. 4 showing a car viewed from the side.

Figs. 5 and 6 are showing a car viewed from above and from the side with only one slit extending between the door openings made at the ends of the long sides. These openings are placed at points 2 and 3.

Figure 9:
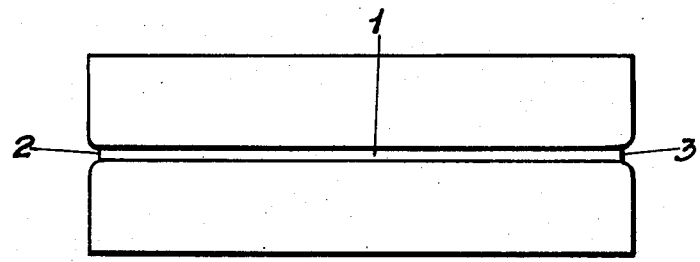
Figure 10:
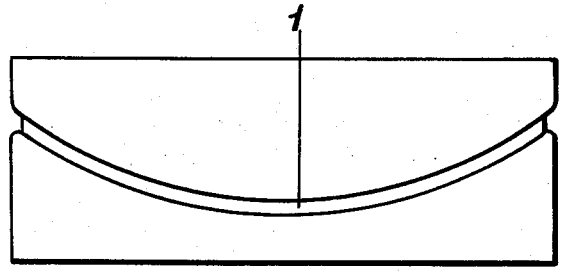

Fig. 9 shows a roof with a slit 1 extending in the middle and running across the whole roof between two opposite entrances at 2 and 3. Preferably this arrangement might be used on covered barges or house-barges. In order to make the slit in the roof of such a barge fit into the swinging loading-boom of a ship's-winch, the slit 1 might be constructed like an arc, according to Fig. 10. Due to the fact that the radii of the booms vary in different vessels, one must adopt the radius for this arc to an average radius for those loading-booms, which probably can be considered for the loading and unloading of the barge in question.

On the whole it can be said about the application of this invention as far as covered wagons of different kinds are concerned preferably however freight cars, that it is very easy to have it put in even on old cars, because the necessary rebuildings do not involve any great practical difficulties. The most important thing to do is to install beams along the edges of the slit in the roof which is to have such a slit. These beams should partly serve as a part of the supporting construction for the roof and also as a coping against the strains, which can arise through the wear of the loading arrangements, especially of the supporting wire ropes or chains. Other functions of these beams are indicated in the following.

Figure 11:
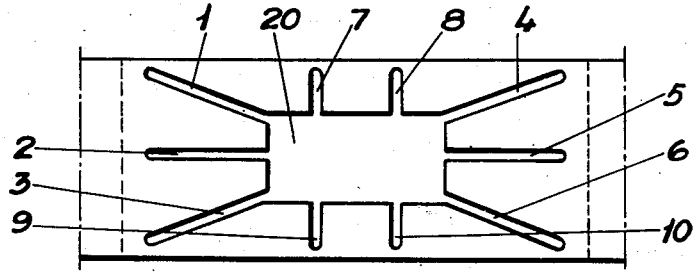

Fig. 11 shows a part of the deck, corresponding to one bulkhead of a loading vessel with the opening to a loading door 20 and slits 1—10 in the deck proceeding from there. In those cases where there are several decks built one above the other in a vessel, only certain decks can be equipped with slits. As especially the top deck of a vessel is an important part from the viewpoint of strength of material of the vessel it may be unsuitable to make the slit in this deck. On the other hand the lower decks are not strained so heavily and may therefore easily be equipped with such slits. Different alternatives regarding the mutual size of the door openings situated above each other can in this connection come in question. The top door opening could be somewhat larger than those below whereby only the lower door openings should be combined with slits extending from there.

Figure 12:
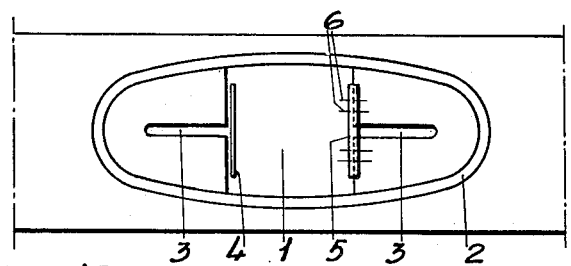

As the slits presumably will be places for breakage or be the cause of dangerous or abnormal diverging of the strains in a deck, the whole area of a door opening with slits extending from it may be enclosed by reinforcements in the deck. Fig. 12 is showing a door opening 1 with corresponding slits 3, which are enclosed by a circle-shaped reinforcement 2 in the deck. By using such an arrangement of reinforcement in combination with some kind of removable device, joining the edges of the slits when the loading and unloading is not taking place, a further increased strength to the deck of a vessel will be obtained. Such a removable device can of course cover a slit in horizontal position, but a vertical device such as a plate 4 attached in some way outside the mouth of a slit, should have a more favorable effect on the diverging of the strain in the deck. Such a plate 5 may be bent in U-shape and be put on the hatch frame. Thereafter throughkeys or conical bolts 6 are placed in corresponding holes thus joining the parts of a hatch frame on each side of the mouth of a slit to a complete unit.

Figure 13:
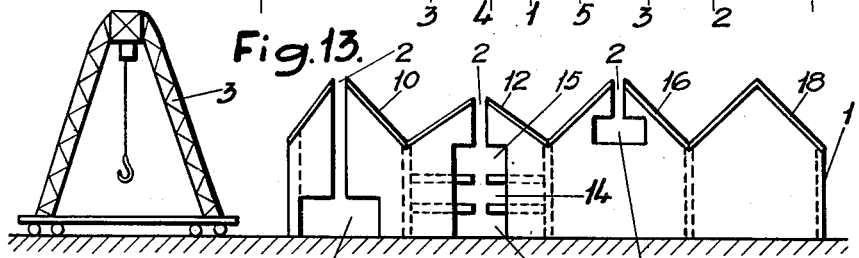
Figure 14:
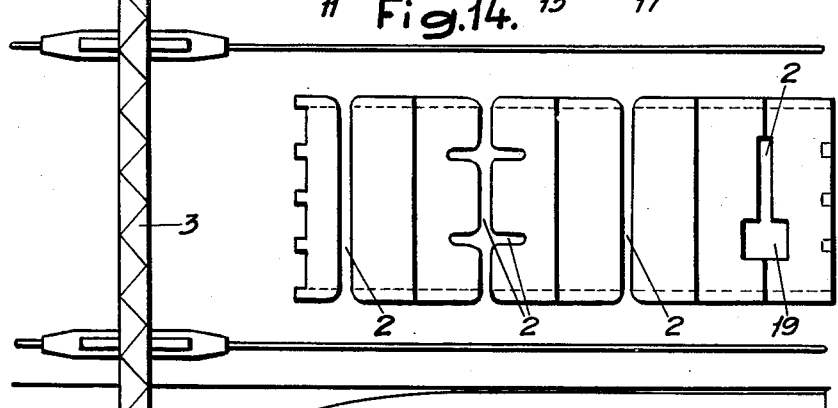

Fig. 14 shows an harbor lay-out, viewed from above, with ware-houses 1, where the roofs are equipped with slits 2 according to the invention. Fig. 13 shows the same lay-out as one would see it standing on the pier backing the edge of the pier.

Figure 15:
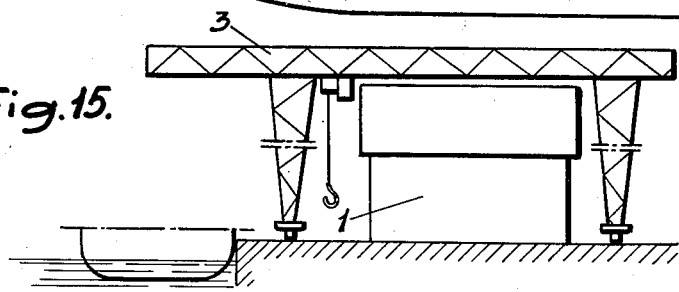

Fig. 15 shows the lay-out as one would see it in the same direction as the pier. The whole lay-out is served by a crane 3. With the help of this crane or other cranes running on the pier goods may without reloading be transported between ships at the pier or cars on the ground and the interior of warehouse-buildings while the load all the time is suspended in the same crane hook. On the drawings are shown some different arrangements of the necessary entrances for the goods to the insides of the warehouse buildings. At the building 10 the entrance opening is placed at the ground, which entrance then also can be used for ground-bound traffic into the building. Besides the doors to the entrance will easily be accessible. A disadvantage is the long slit in the wall above the door. Another disadvantage is the long round-about way for crane-carried goods, which has to be lowered all way down to the ground in order to pass in or out. These disadvantages and advantages have been changed at the buildings 16 and 18 with the placing of the entrance openings high on the gable-wall at 17 or in the roof at 19. The two latter placings are advantageous particularly when transporting goods in bulk with a bucket or the like. When storing piece-goods, buildings in several stories are often preferred as the building 12, where each of the three stories has its own entrance opening 13, 14 and 15.

On buildings there are of course many other ways of applying the invention than those shown on drawings 13–15. There are for instance in certain cases similar special arrangements applicably which previously have been described in connection with Figures 1–12.

It is also possible to arrange slits in a roof circularly about a centre where a swinging crane is placed above the roof. Especially one can notice the case when a building is built with semicircle formed slits, the centre of which is situated at a wall of the building. A crane placed at this centre will then control both the place outside the wall and the building on the inside of this wall. If all the walls within the building are radially arranged, the crane operator may from the same centre survey each part within the building. As a rain protection for a slit a flexible rubber hose may be used. This hose should have sufficient thickness so as not to fall through the slit.

Figure 16:
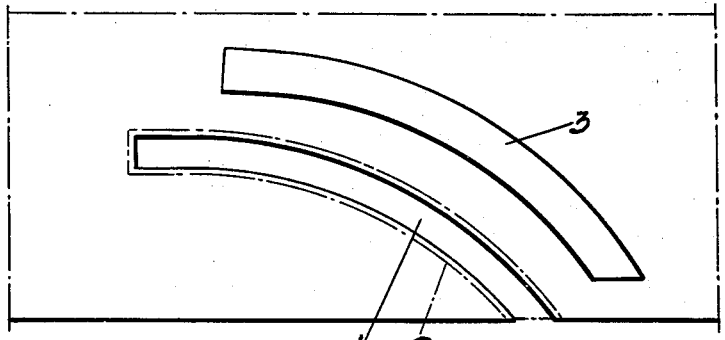
Figure 17:
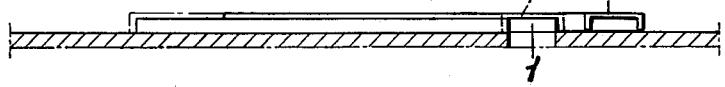
Figure 18:
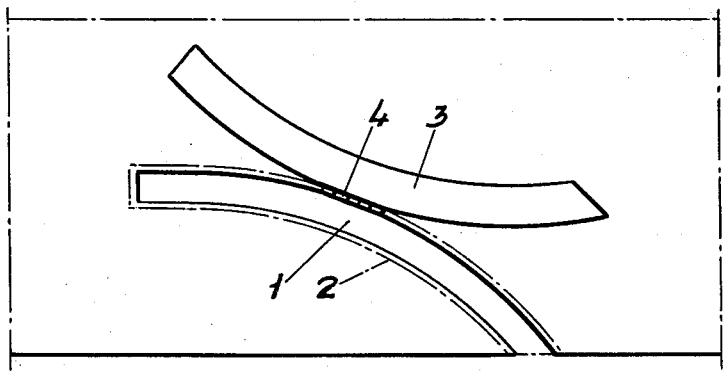

Fig. 16 shows from above a slit 1 in a roof of any kind as previously described. This slit is covered with a cover or lid, when loading and unloading does not take place. Fig. 17 shows a section of a roof with slit and its cover or lid in cross-section. On both these drawings 3 shows the position of an opened cover or lid and 2 indicates the position of a closed cover or lid. At the opening and closing movements this cover or lid moves parallelly. This may for instance be accomplished by means of a chain system of some kind handled from the inside when suitable. The possibility of locking the cover or lid from the inside is of course often necessary. Fig. 18 shows with corresponding denotations a cover or lid which may be turned on hinges 4 when operated. Covers or lids arranged in pairs, which can be closed against each other in the same way as a pair of double-doors may also be used.

In case the requirements for the strength of materials of a car, building or vessel are particularly rigid both of the edges of a slit can be equipped with reinforcements suitably joined with a lid or cover. This reinforcement should then be so arranged that the edges of a slit will be automatically locked when the cover or lid is laid down over a slit. This will be achieved, for instance, by wedges or screws fixed on the movable cover or lid and brought into action when the cover or lid making certain turning movements or other suitable movements is placed over the slit. In such a way especially the ends of carrying beams for a roof or a deck on each side of a slit could be joined.

Figure 19:
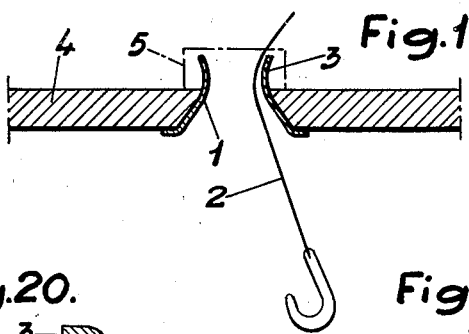

Fig. 19 shows a part of a roof 4 with a section of its slit in cross-section. As shown on the figure the edges of the slit which should be rounded to allow a side-pull of the lifting wire rope or chain 2 without damaging it, have been equipped with a special coping or protection 1. Its top-part 3 serves as a frame for the cover or lid 5 and also as a drain for rainwater falling down on the roof.

Figure 20:
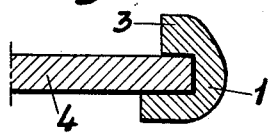
Figure 21:
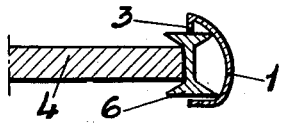

According to Figure 20 the coping 1, retaining the same functions, has also been formed into a supporting beam for the roof 4. In Figure 21 the coping has been so shaped that in combination with a supporting beam 6 it also renders the same service as above. On the drawing the beam 6 is an I-beam but also other beam-profiles can be used for the same purpose.

Figure 1:
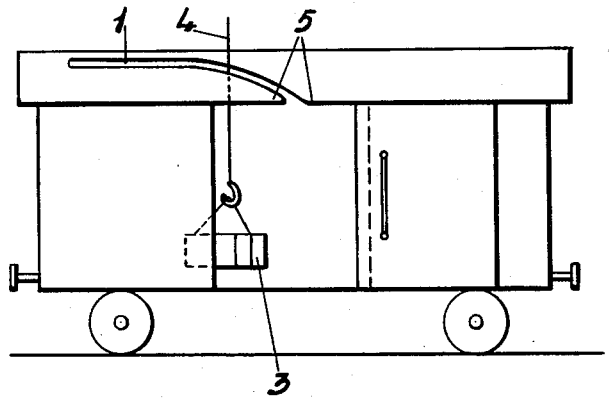
Figure 2:
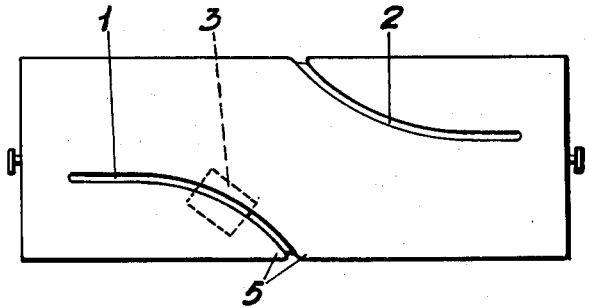
Figure 3:
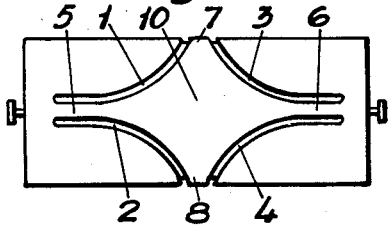
Figure 4:
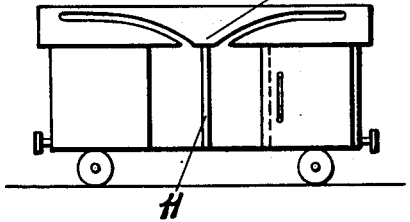
Figure 5:
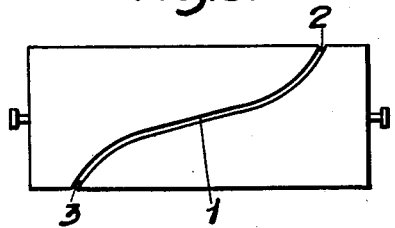
Figure 6:
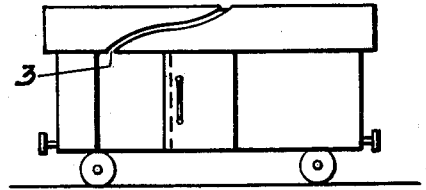
Figure 7:
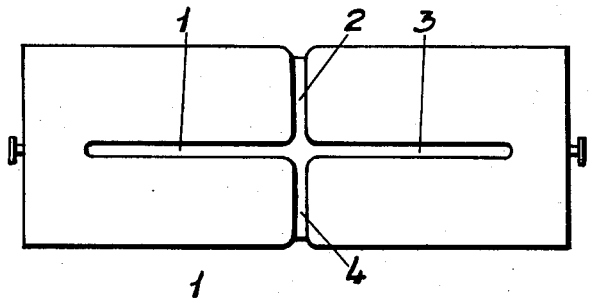
Fig. 7 shows the roof of a car with slits 1, 2, 3 and 4 arranged crosswise. This presupposes, that door openings are normally made in the middle of the car sides.
Figure 8:
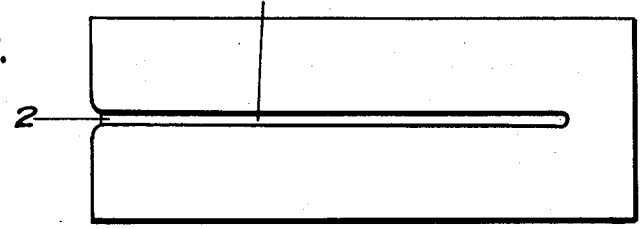
Fig. 8 shows a roof over a car with entrance at one short end under the mouth 2 of the slit 1, an arrangement which can be used on special railroad cars or on covered trucks, delivery wagons etc. The slit in the roof should in such cases preferably be made in the centre.

Figs. 22–24 show a roof 1, in which a slit 2 has been made. In the slit a guiding device 3 slides, which is so constructed as to replace the rounded coping along the slit as per Figs. 19–21. When a load hanging in a wire rope or chain is introduced into a slit, the wire rope will be caught by the guiding device which guides the wire rope all the time while it moves in the slit until the wire rope again leaves the slit. The guiding device will stay at the mouth of the slit until a wire rope again is introduced into the slit. Fig. 22 shows a vertical cross-section of the guiding device in closed position although no wire rope is shown. Fig. 23 shows a horizontal cross-section of the guiding device in closed position and Fig. 24 a similar cross-section of the guiding device in open position situated at the mouth of the slit. Corresponding details have the same numbers on all three figures. 4 and 5 are half-circle-shaped sliding details rounded on the inside which preferably should have a glass-hard surface. 6 and 7 are springs which are holding together the sliding details in closed position and are acting as gripping claws when the guiding device is in open position.

To obtain rain protection the two edges of a slit could also be covered with strips of canvas or similar flexible material, the edges of which will meet right over the slit. When a wire rope is introduced into the slit these edges will automatically open and then again close after the wire rope having passed by. A guiding device according to Figs. 22–24 can be arranged so that it will raise the edges of canvas strips so that the wire rope does not touch them directly.

Figure 25:
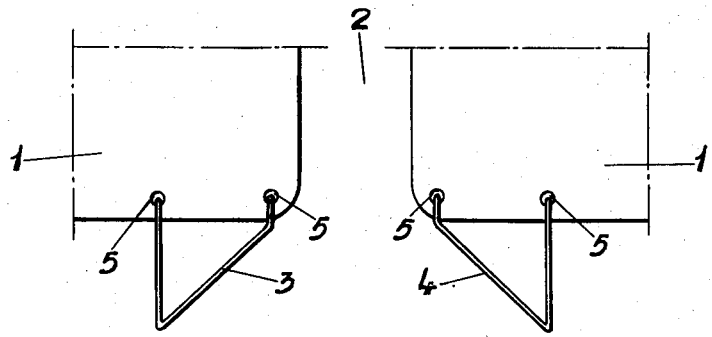
Figure 26:
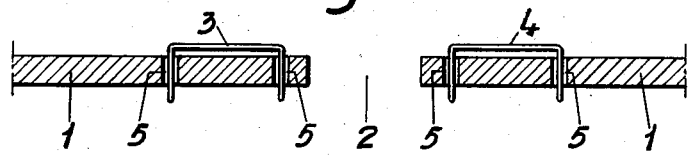
Figure 27:
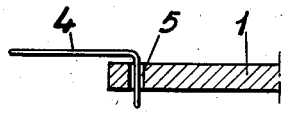

In order to increase the effect of the rounding of the corners at the slit entrance, which rounding is used so that a crane operator more easily may introduce a wire rope into the slit, additional guiding devices outside the slit entrance can also be used. These could of course be shaped in a variety of different ways, for instance folding against roofs or walls, sliding into openings or the like or left loose, hanging in holes on hinges etc. Figs. 25–27 show in different directions the arrangement of a couple of loops 3 and 4 acting as guiding devices. These loops are put in the holes 5 of the roof 1 on each side of the slit entrance 2. Fig. 25 shows the roof from above, Fig. 26 shows a cross-section on the same plane as the holes 5 and Fig. 27 shows a cross-section on the same plane as one of the holes parallel to the slit 2.

The invention is applicable also to air-ships especially to loading spaces of freighters. As in this case the requirements of the strength of materials of hulls and supporting constructions are particularly rigid, it is important that the slits before a take-off are well joined with sufficiently strong bonds. In this case the requirements on light weight and little air-resistance should also be provided for.

If an unbroken supporting beam crosses a slit in a roof, deck or some other covering surface, it is still made possible to introduce a crane wire rope or similar lifting device into the slit in a way which is typical of the invention, however with the reservation that the crane wire rope must be unloaded before and reloaded after passing the crossbeam.

The most important question in solving the problems arising in connection with the present invention is how the crane operator in the right way will be able to adjust the movements of the machinery, when the wire rope with its load runs through a slit in a roof and it is difficult for him to see what is happening below. A number of measures could be adopted in order to remedy this difficulty. These are for example the following:

1. Improved signal arrangements

In the past the method of signalling to a crane operator at loading and unloading of a vessel has been that a person has been placed near the edge of the opening to watch the work in the hold while coordinating by means of signs to the crane operator the work of the latter with that of the men in the hold. By using modern telephone such as internal telephone-system and short-wave wireless, the connection between crane operators and stowing personnel could be simplified and improved, not only when it comes to vessels but also when reloading cars and at work in warehouses and similar buildings where the invention in question is being applied.

2. Glass roof in combination with good inside lighting

In many kinds of warehouse buildings etc., where this invention is to be applied, glass roofs or glass windows may be used thus enabling the crane operator to have a good survey of the work inside the building. Simultaneously very strong lighting can be arranged inside the building, so that the reflection from the daylight against the glass will be neutralized.

3. Remote control of the crane machinery

In cases where the arrangement of the crane machinery and the possibilities to lay electric cables allow it, a direct maneuvering of the crane and lighting machinery from the inside of such rooms where loading and unloading is taking place, can be considered.

4. Delicate maneuvering block in the crane hook

A kind of direct maneuvering can also be accomplished in such away that small movements of the load are brought about by means of for example a loading block which is hanging in the crane hook and in its turn carries the load itself. If it is a question of lowering the load, a hand-block can of course be of good service as in case of small upwards-movements, if cables for power supply can be arranged the block can of course be machine driven.

5. Adjustment of the movements of a crane machinery according to the curvature of slits An arrangement facilitating the work of the crane operator when using slits in the roofs of cars, vessels and buildings is to adjust the movements of the machinery so that it will automatically follow the extension of the slits at disposal. If for instance a telpher is used for lifting and transporting goods, the rail for the same can be bent to correspond with the slit of the car to be loaded in such a manner that the carrying wire will always run vertically to the slit without wearing against the edges, provided that the car has been properly placed. If a telpher or carrier has been made to travel within a traversing-crane in such a manner that its runway within the traversing-crane is congruent to the slit of a car-roof, adjustments can also be made by the movements of the traversing-crane. Corresponding installations can of course be arranged in other types of cranes and lifting devices. Standardizing of the shape of the slits will in this connection be advantageous.

6. Improved safety arrangements

In order to increase the safety of work the best possible safety arrangements should be used. In order to get protection against the danger of a crane operator by mistake running the load into the roof whilst working with the load suspended under a slit, safety relays should be used, which already at a relatively moderate overload in the crane hook will react on the motive power and stop the machinery.

Above a description has been given of the application of the invention mainly when it is a question of more or less regular transport of various goods. It is, however, evident that the invention also can be applied to conveying goods, which can be described as a one-time transport within, or to and from different kinds of stationary or moveable rooms. By this is thus meant for instance the equipping of a machine hall or factory premises with slits in the roofs in order to be able to move in machines and equipment after the completion of the building, or to be able to make repairs or remove the fixtures etc. or to take in building material. Another example is a vessel, which gets slits in certain decks in order to facilitate its building or to facilitate taking in machine equipment or the repair or exchange of machines etc.

Having now described my invention, what I claim as new and desire to secure by Letters Patent is:

1. In a roof for storage structures having an opening for the reception of goods, at least one narrow slot in said roof in unobstructed communication with said opening, said slot adapted to permit passage of an overhead suspended cable attached to a load of goods passing through said opening.

2. Device as claimed in claim 1, in which the slot is equipped with a cover, which may be removed in some known manner.

3. Device as claimed in claim 1, in which the edges of the slot have been rounded off in order to reduce the wear on the lifting cable.

4. Device as claimed in claim 1, in which the edges of the slot are equipped with protecting rails.

5. Device as claimed in claim 1, in which the upper part of the slot has upwardly projecting edges serving to lead away rain water.

6. Device as claimed in claim 1, in which the slot is provided with guiding means for the lifting cable, said guiding means running in the slot and enclosing the cable.

7. Device as claimed in claim 1, in which the slot at the inlet thereof is provided with fixed, hopper-shaped guiding means.

NILS INGEMAR SCHWALBE.

REFERENCES CITED

The following references are of record in the file of this patent:

UNITED STATES PATENTS

| Number | Name | Date |
|---|---|---|
| 989,702 | Gurney | Apr. 18, 1911 |
| 1,012,103 | Schmidgall | Dec. 19, 1911 |
| 1,072,600 | Gillespie | Sept. 9, 1913 |
| 1,654,957 | Bradshaw | Jan. 3, 1928 |